United States Patent Office 3,503,326
Patented Mar. 31, 1970

3,503,326
FILTER PRESS
Adam Juhasz, Budapest, and Attila Mahig, Almasfuzit, Hungary, assignors to Chemokomplex Vegyipari Gep-es Berendezes Export-Import Vallalat, Budapest, Hungary
Filed Dec. 30, 1966, Ser. No. 606,470
Claims priority, application Hungary, Jan. 8, 1966,
Ju 169
Int. Cl. B30b 9/06
U.S. Cl. 100—115                                    1 Claim

ABSTRACT OF THE DISCLOSURE

A filter press is composed of filter frames juxtaposed without the insertion of filter plates. Each frame has separate diaphragms on opposite sides thereof, which carry on their outer sides filter cloths with spacers between the diaphragms and filter cloths. The liquid is fed between adjacent filter cloths of two different filter frames and the filtrate is abducted between associated filter cloths and diaphragms. A filter cake remover comprises an endless net both webs of which are between adjacent filter frames. The filter cake adheres to the net and coheres through its meshes; and when the frames are opened, the cake is discharged by separating from each other both webs of the net, causing the filter cake to split and drop.

---

This invention relates to a filtering apparatus.

In U.S. Patent No. 3,390,772, it has been suggested to carry out filtering by means of a filter press having no filter plates in which case filtering cloths are fixed to the surface of inflatable bladders disposed in filter frames. With such arrangement, the filter frames comprising the inflatable bladders are juxtaposed, and the substance such as a suspension or slurry to be filtered is fed between pairs of said inflatable bladders, the filter cakes being formed in filter chambers which are appearing at the expense of a volume decrease of said inflatable bladders while filtering is going on.

Though the use of inflatable bladders does not strike on any difficulties in the most cases of filtering, their employment may, in some special cases, yet be cumbersome. For instance, if inflatable bladders are used for filtering of very aggressive substances, the slurry or suspension to be filtered contacts, along the outer periphery of the inflatable bladders, the interior surface of the filter frames made of metal. Such contact entails an accelerated corrosion of the filter frames which can be avoided or reduced only by the use of very expensive corrosion resistant metals. Similarly, the employment of inflatable bladders is difficult in case of filtering substances liable to decomposing or contamination such as certain foodstuffs or pharmaceutical products. This is due to a certain amount of slurry or suspension which collects in the gaps between the inflatable bladders and their filter frames, such gaps being unavoidable since the diameter of the inflatable bladders have to be smaller by some millimeters than the interior diameter of the frame so as to permit of changing the bladders or the frames, as the case may be. A regular removal of the slurry or suspension collected in the aforesaid gaps and cleansing of the latter is cumbersome and difficult to carry out.

The main object of the present invention is to avoid the aforesaid difficulties and to extend the domain of employment of filter presses according to the aforesaid patent for the purpose of filtering substances which are aggressive and liable to decomposing. This is obtained by substituting diaphragms for the inflatable bladders without changing the principle of operation and the nature of destination of the latter.

A further object of the invention is to provide means for removing the filter cakes from the filter presses or for furthering such removal. More particularly, the invention aims at an apparatus which is particularly suitable for filtering substances which are, otherwise, difficult to filter. Accordingly, the invention is, in the first place, concerned with a filter press which comprises, in a manner known per se, filter frames movably arranged on a support, the main feature of the invention being that the filter frames are, on both their sides, provided with diaphragms carrying filter cloths, and are juxtaposed without the insertion of filter plates, spacers being provided between said diaphragms and said filter cloths.

Further objects and features of the invention will be described in conjunction with the accompanying drawings which show, by way of example, some embodiments of the filter press according to the invention and in which.

Same reference characters indicate similar details throughout the drawings.

Figure 1:
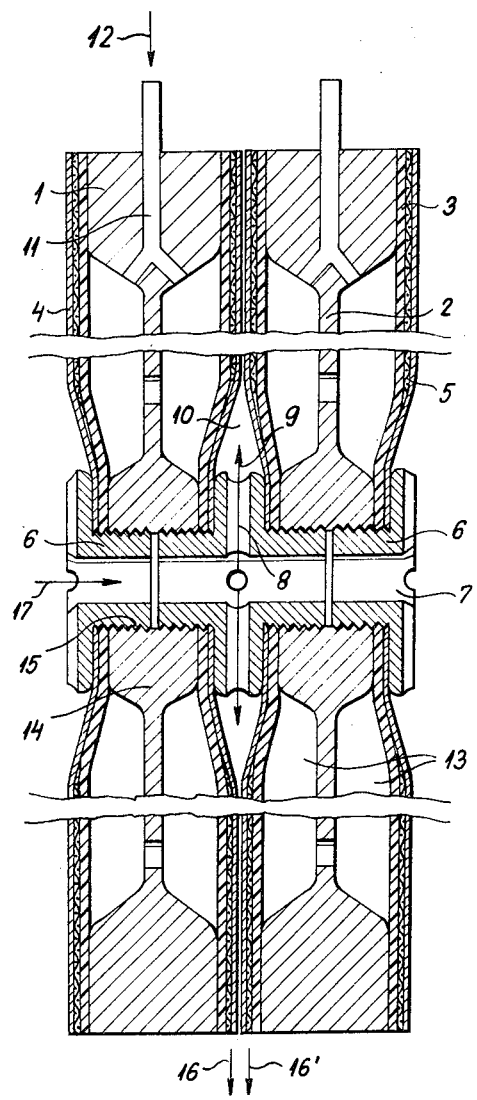
FIGS. 1 to 3 are each a longitudinal sectional view of a part of a pair of filter frames of a filter press according to the invention.

In the drawings, only one pair of filter frames are illustrated and it will be obvious to those skilled in the art that a filter press may comprise an optional number of such filter frames which are sandwiched by a pair of closing means known per se and, therefore, not shown. The frames are disposed, in a manner not illustrated, on a horizontal support forming part of the filter press proper so that, upon closing or opening of the latter, they are displaced horizontally. The filter frames may be of any desired shape. Preferably, however, circular or rectangular filter frames will be employed. The slurry or suspension to be filtered may be introduced at the top at the centre or at the bottom portion of said frames.

With the exemplified embodiment shown in FIG. 1, the filter frames of the filter press consist of an outer frame 1, an inner frame 14, and a web plate 2 connecting said outer frame 1 and said inner frame 14. The web plate 2 may fill in the whole field encircled by the outer frame 1 and inner frame 14 or a portion thereof. In the latter case, the web plate 2 may be foraminated or shaped in the form of spokes.

The inner frames 14 confine, in the instant case, each a passage 15 which is threadedly engaged by a pair of hollow cores 6. The latter form a channel 7 for the introduction of a slurry or suspension in a direction indicated by arrow 17. The introduced substance flows through radial passages 8 in the direction of arrows 9 into filter chambers 10. Moreover, the cores 6 are destined to fix diaphragms 3 and filter cloths 4 with spacers 5 therebetween onto the front surfaces of the inner frames 14 by sandwiching the former with the latter in the illustrated manner.

The chambers encompassed by the outer frames 1, the inner frames 14 and the diaphragms 3 on both sides of the filter frames may be connected by means of a channel 11 with an exterior pressure source not shown the pressure of which may propagate thereinto through a not represented control means, as indicated by arrows 12. It is seen that the diaphragms 3 and the filter cloths 4 with the spacers 5 therebetween are fixed to the filter frame 1, 14 only at the central portions of the latter while at their periphery fixing is obtained by the frames, the diaphragms and the filter cloths being compressed by the aforesaid closing means.

The diaphragms 3 and the filter cloths 4 enclose said spacers 5 to the passage of a filtrate from the filter chambers 10 between adjacent cloths 4, and are united e.g. by means of bonding along their whole surfaces or along portions thereof, more preferably along their outer peripheries. However, the diaphragms 3 may be bonded to the side surfaces of the outer frames 1 only by which they are prevented from dropping when the filter frames are spaced apart. Portions of the diaphragms 3 contacting the outer frames 1 of the filter frames will preferably be reinforced e.g. by a fabric several layers of which are embedded in the body of the diaphragm.

Figure 2:
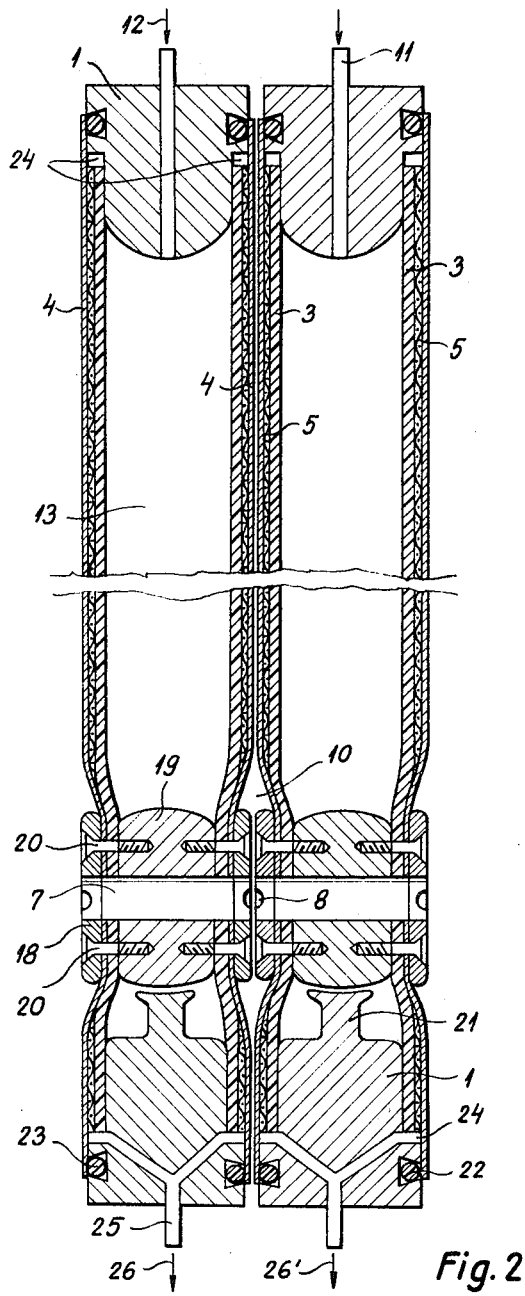

The exemplified embodiment illustrated in FIG. 2 differs from the previous one mainly in the manner of introducing the substance to be filtered. Furthermore, there are only outer frames 1 for filter frames which are ring shaped so that continuous chambers 13 are created between adjacent diaphragms 3, the chambers 13 being connectable by means of the channels 11 to the aforesaid not represented source of pressure as has been described in connection with the previous embodiment.

Cylindrical cores 19 and plates 20 sandwich the diaphragms 3, the spacers 5 and the filter cloths 4 by means of screws 20. Thus, a tight sealing is obtained which prevents that the substance to be filtered penetrate into the chamber 13 or the pressure escapes therefrom. At their peripheries, the diaphragms 3 and the filter cloths 4 are connected with the filter frames 1 by means of sealing rings 23 disposed in peripheral grooves 22. Such fixing is enhanced by the compressing force acting between juxtaposed filter frames upon their being sandwiched by the not represented closing means of the filter press.

Filtrate is collected through channels 24 and 25 from which it withdraws in the direction of arrows 26 and 26'.

When the filter frames are juxtaposed and compressed by the closing means, the cylindrical cores 19 and the plates 20 form a central channel 7 and radial channels 8 which serve for introducing the substance to be filtered into filter chambers 10.

Lugs 21 forming part of the lower portions of filter frames 1 permit of releaving the diaphragms 3 from the pulling action of plates 18, cores 19 and screws 20 and, at the same time, ensure the coaxial positions of the channels 7 in the various filter frames 1.

Figure 3:
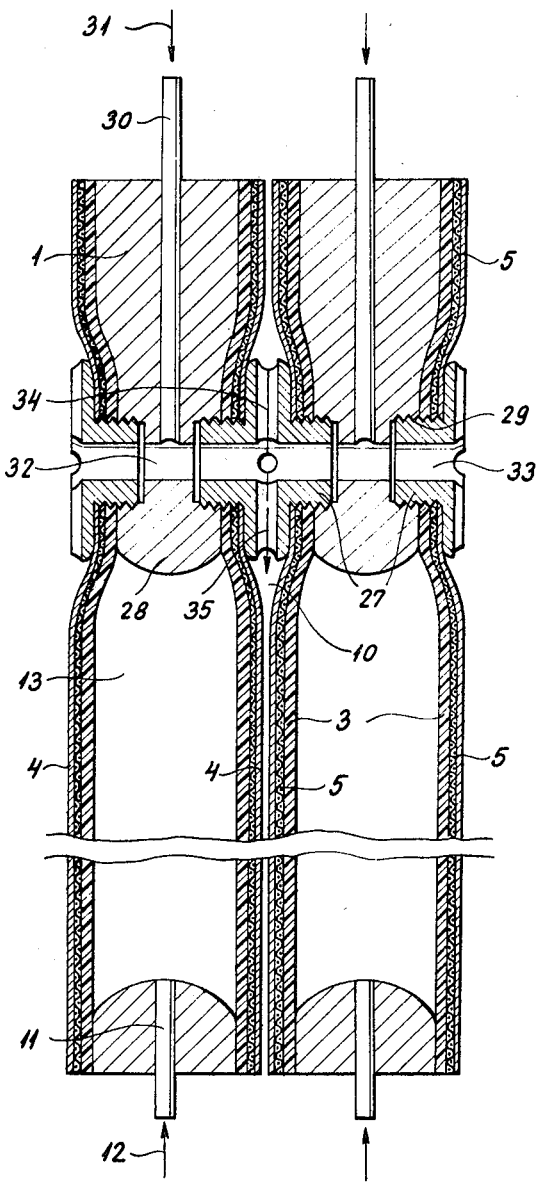
Figure 4:
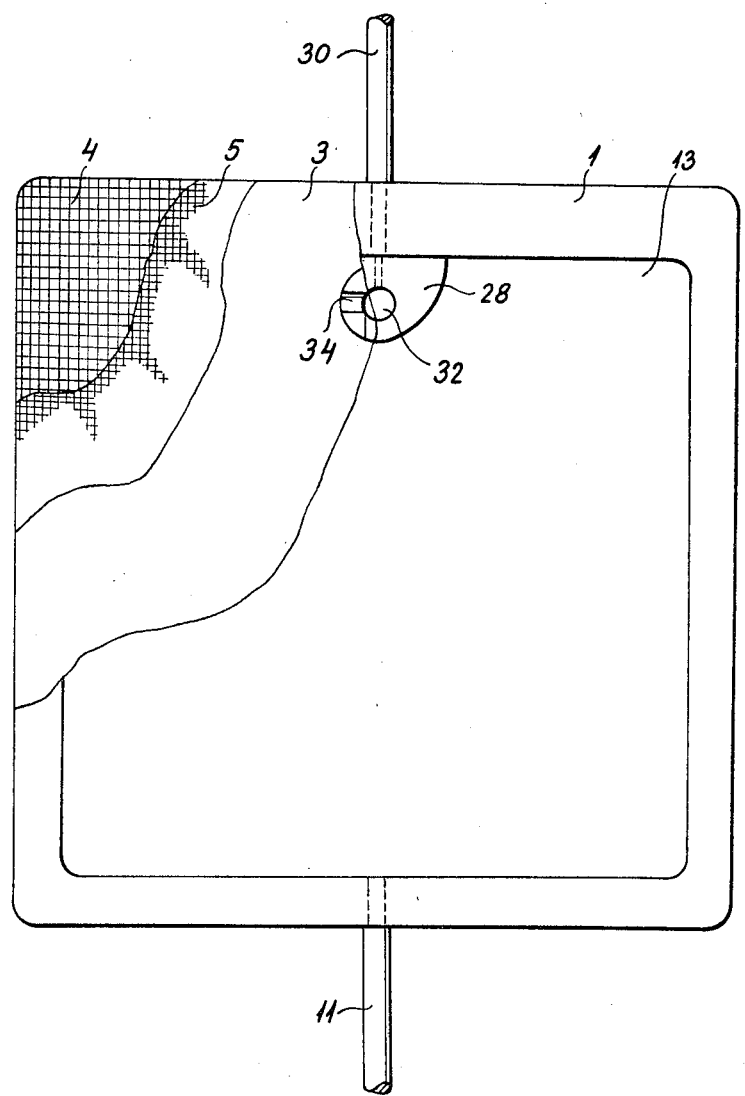
FIG. 4 is a side elevational view, partly in section, of a filter frame shown in FIG. 3.

The exemplified embodiment illustrated in FIGS. 3 and 4 differs from the one shown in FIG. 2 mainly in the manner of introducing the substance to be filtered. Here, the slurry or suspension is introduced individually into each filter frame through ducts 30 from which it flows into an axial channel 32, 33 and from here through radical channels 34 into the filter chambers 10. Such conduits may be made of synthetic materials if strongly aggressive substances are to be filtered.

Tightly sealed fixing of diaphragms 3, spacers 5 and filter cloths 4 is obtained by flanges of cores 27 threadly engaged with extensions 28 of the filter frames 1 at their top portions.

In operation, upon the filter frames 1 being compressed by the closing means of the filter press in a manner known per se, the slurry or suspension to be filtered is introduced through the various channels into the filter chambers 10.

In case of the exemplified embodiments shown in FIGS. 1 and 2, the substance to be filtered is introduced directly into the channel 7 at one or both extremities of the filter press, whereas, with the embodiment shown in FIG. 3, it reaches the filter chambers 10 through the channels 30, 32, 33 and 34.

Under the feed pressure, the diaphragms 3 bulge in so that the volume of the chambers 13 between the diaphragms 3 gradually decreases whereas the volume of the cake chambers 10 increases until the chambers 13 between the diaphragms 3 practically cease to exist. Then, the diaphragms 3 lie, in case of the exemplified embodiment according to FIG. 1, against the web plates 2 whereas, in case of the embodiments according to the FIGS. 2 and 3, respectively, they lie against one another.

The feed pressure of the substance to be filtered causes the liquid portion thereof to penetrate through the filter cloths 4. The filtrate withdraws, in case of the exemplified embodiment shown in FIG. 1 through the passages in the spacers 5 peripherally as indicated by arrows 16 and 16'. With the exemplified embodiment shown in FIG. 2, the filtrate flows through the passages in the spacers 5 into the channels 24 from which it withdraws through the channels 25 in the directions of arrows 26 and 26' whilst the filter chamber 10 of increasing volume becomes gradually filled by a filter cake growing of the solid portion of the substance to be filtered. In case of the embodiment according to FIG. 3 the filtrate withdraws in a not represented manner peripherally.

Figure 5:
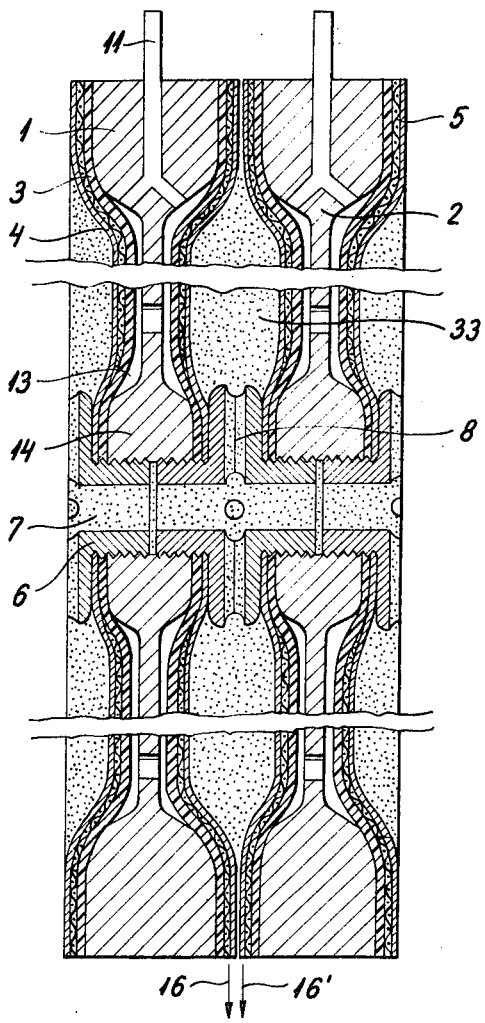
FIG. 5 shows the exemplified embodiment according to FIG. 1 in an intermediate operational position and in longitudinal sectional view.
Figure 6:
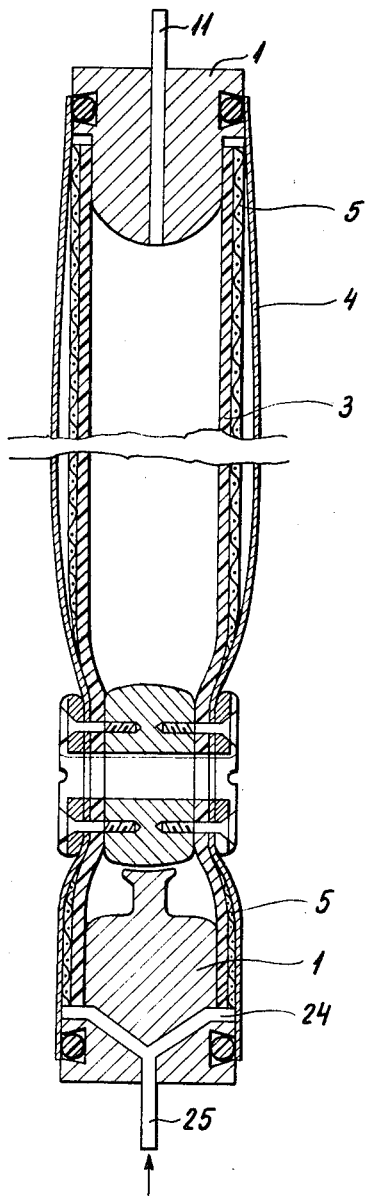
FIG. 6 illustrates the removal of filter cakes by means of introducing a pressure fluid.

Filtering being finished, no further amounts of slurry or suspension are introduced. Instead, a pressure is created in the chambers 13 between the diaphragms 3 through the channels 11 as indicated by arrows 12. Such operational period is, in case of the exemplified embodiment shown in FIG. 1, illustrated in FIG. 5. The introduced pressure fluid causes the diaphragms 3 to resume their original position while the chambers 13 therebetween commence to increase. Thereby, the filter cakes 33 present in the filter chambers 10 suffer an additional compression which results in decreasing their moisture content.

When such additional compression is finished, the pressure prevailing in the chambers 13 is relieved. In a manner known per se, the filter frames 1 are spaced apart. Then, the filter cakes 33 formed in the filter chambers 10 are thrown out by the diaphragms 3 which, under the action of their own elasticity, resume their undeformed initial shape as has been described in the aforesaid patent specification. The pushed out filter cakes 33 drop from between the spaced apart filter frames 1 under the action of their own weight.

If the weight of the filter cakes 33 is not enough for causing them to drop from between the spaced apart filter frames 1 which may be due for instance to adresion of the filter cakes 33 to the filter cloths 4, it is possible to separate the cakes from the filter cloths by means of causing the diaphragms to bulge out, e.g., with the exemplified embodiment shown in FIG. 2, a pressure fluid such as air is introduced between the diaphragms 3 and the filter cloths 4 through the channels 25 and 24, and the passages formed by spacers 5. Under the action of the incoming pressure fluid the filter cloths 4 bulge out and the air penetrating therethrough causes even sticky filter cakes to be separated therefrom and drop. For such cases, diaphragms 3 and filter cloths 4 are connected, e.g. bonded together only along their peripheries.

Figure 7:
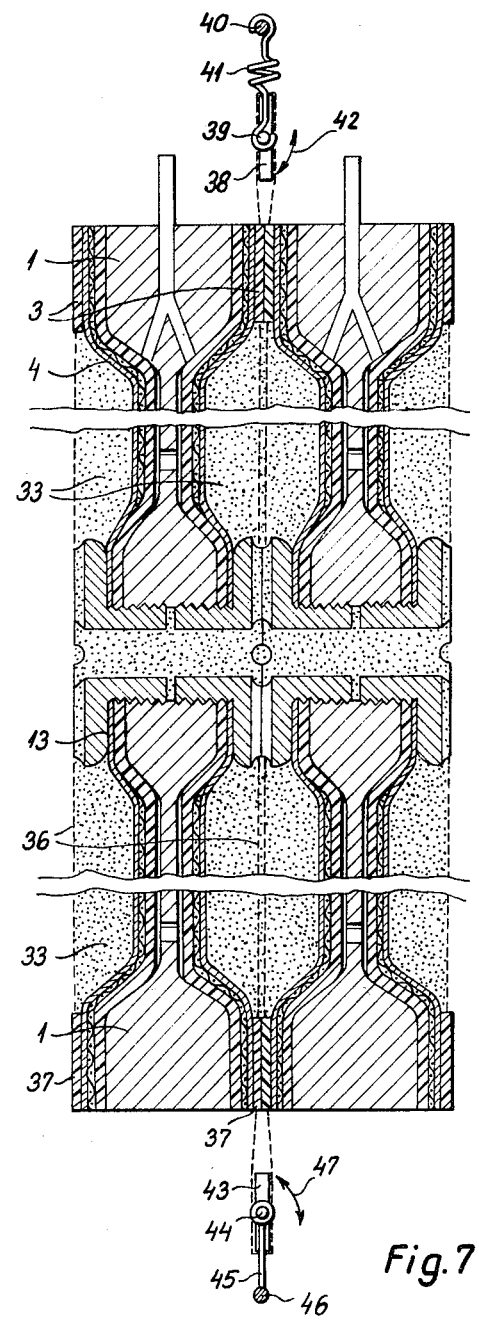
FIGS. 7 and 8 show an exemplified embodiment of the cake removal means according to the invention in two different operational positions.
Figure 8:
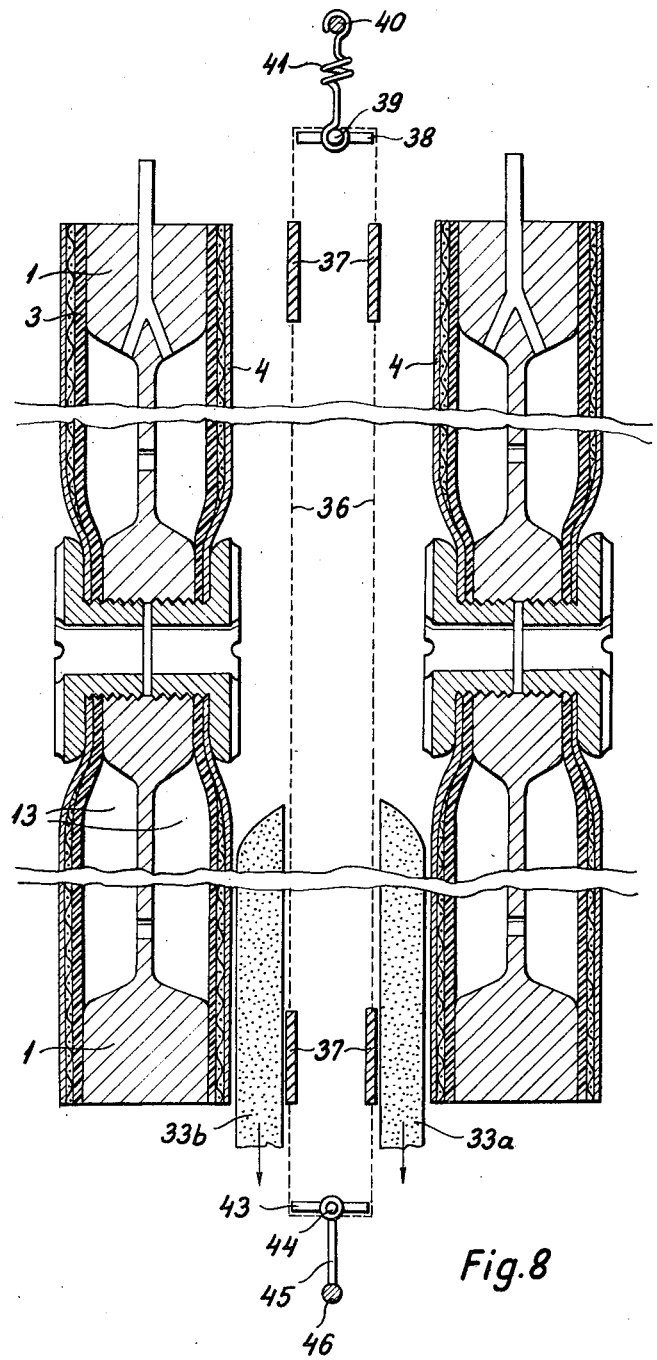

The filter cakes may be removed by means of a device shown, by way of example, in FIGS. 7 and 8 in conjunction with filter frames 1 illustrated in FIG. 1 though such device may be employed with any embodiment of the invention.

In the instant case, the cake removal device comprises an endless net 36 made of metal or synthetic material and tightened by flat bars 38 and 43 disposed above and beneath the series of filter frames 1 and pivotally arranged on horizontal axes 39 and 44, respectively. Biasing springs 41 serve for spacing apart the flat bars 38 and 43 so as to tighten the endless nets 36, and are supported by carrier rods 40 supported, in turn, by the frame of the filter press. In a similar manner, the bottom flat bars 43 are connected by means of arms 45 with a carrier rod 46 supported likewise by the frame of the filter press in a not represented manner. Both tightening bars 38 and 43 may be angularly displaced under an angle of 90° in the direction of arrows 42 and 47, respectively, around their respective axes 39 and 44, whereby the tightening action of the springs 41 is continuously working during both angular displacements and thereafter. Where the net 36 is, in a compressed position of the filter frames 1, exposed to pressure, it is covered with a sealing layer 37 made e.g. of synthetic material and destined to prevent the substance to be filtered to escape from the cake chambers 10 along the nets 36 while filtering and compressing is carried out.

In operation, due to the filter frames being compressed prior to the filtering process, both strands or webs of the net 36 lie against one another so that the filter cakes 33 will be created on both sides of the said strands, though both filter cake parts will cohere through the meshes of the nets. Thus, each filter cake 33 is but one body which has, as it were, the net 36 incorporated therein as can be seen in FIG. 7.

Filtering and compressing having been finished, the filter frames are spaced apart in such a manner that the net 36 be suitably distanced from both adjacent filter frames. Thus, the filter cake will part with the filter cloths and will hang down on both sides of the net 36. The adhesion of filter cakes to filter cloths has been found smaller than the inherent cohesion of compressed cakes so that the latter are liable to be separated from the filter cloths rather than to be split along the net 36.

Now the flat bars 38 and 43 are rotated by an angle of 90° whereby both strands of the endless net 36 become spaced apart and the filter cakes 33 split into parts 33a and 33b as shown in FIG. 8. Then the parts 33a and 33b will drop from between the net strands 36 and their associated filter cloths 4 as indicated by arrows in FIG. 8.

Such method of removing the filter cakes permits of filtering suspensions which, otherwise, are extraordinarily difficult to filter and the filtering of which practically cannot be carried out in hitherto known filter presses. If a layer of such cake material of some millimeters' thickness is formed on a filter cloth, the resistance of the filter cake becomes so high that further amounts of the liquid portion of a substance to be filtered are practically uncapable to penetrate through such layers and to reach the filter cloths proper. No means have hitherto been proposed to remove such thin layers.

The filter press according to the invention and shown in FIGS. 7 and 8 permits of filtering such substances. For this purpose, the very thin cakes formed on both sides of the net 36 are pressed onto the latter by means of introducing a pressure fluid into the chambers 13 between the diaphragms 3 in the manner as filter cakes are compressed in case of substances more suitable for being filtered. In the present case, however, only a very thin filter cake is obtained in one filtering process. Therefore, the filter frames will not be spaced apart instead of which the thin cakes are pressed onto the net 36 in the described manner and new substance to be filtered is introduced into the filter chambers. Thus, the originally formed filter cakes part with their respective filter cloths and rest adhering to the net 36 so that filtering can be carried out again by means of filter cloths having clean filtering surfaces without the necessity to remove the previously formed filter cakes from the filter press. The layers formed in such subsequent filtering cycles, will, by means of the diaphragms 3, again be pressed onto the net 36, more particularly onto the layers of cake material already there. It has been found that layers of cake material formed in subsequent cycles will homogeneously cohere with one another and such coherence is stronger than the adherence of the filter cakes to the filter cloths. Thus, filtering, on the one hand, and pressing the formed filter cake material layers onto the net, on the other hand, may be repeated without opening the filter press until the filter cakes become thick enough for being removed therefrom in the above described manner. Such forming and removing is obviously a new filtering method in which spacing apart the filter frames and removing the filter cakes is, in compliance with the invention, performed each time only after a cycle of several filtering and compressing periods have been carried out.

What we claim is:

1. A filter press comprising a series of filter frames displaceably mounted on a horizontal support, a flexible diaphragm on each side of each filter frame, a filter cloth adjacent each diaphragm, a spacer between each diaphragm and associated filter cloth, the filter frames with the flexible diaphragms, the spacers and the filter cloths of them being directly juxtaposed without the insertion of filter plates so as to pairwise enclose filter chambers by adjacent filter cloths of different filter frames, each flexible diaphragm together with its spacer and filter cloth having an opening therethrough that opens into the filter chamber for a liquid to be filtered, an endless mesh net having a pair of webs disposed between each juxtaposed pair of filter cloths so that filter cake will form on both sides of said webs and cohere through the meshes of the net, and means for moving apart from each other the webs of each said pair of webs when the filter press is open thereby to cause the filter cake to split and drop.

References Cited

UNITED STATES PATENTS

| | | | |
|---|---|---|---|
| 387,594 | 8/1888 | Kroog | 100—211 X |
| 2,932,399 | 4/1960 | Emele | 210—225 |
| 3,073,238 | 1/1963 | Vitali | 100—198 X |
| 3,098,429 | 7/1963 | Hagglund | 100—211 X |
| 3,117,084 | 1/1964 | Nick et al. | 210—411 X |
| 3,270,887 | 9/1966 | Juhasz et al. | 210—225 |
| 3,289,844 | 12/1966 | Emele | 210—225 |
| 3,347,383 | 10/1967 | Augerot | 210—229 X |
| 3,360,130 | 12/1967 | Kaga | 210—225 |
| 3,390,772 | 7/1968 | Juhasz | 210—225 X |

FOREIGN PATENTS

| | | |
|---|---|---|
| 708,441 | 4/1965 | Canada. |

REUBEN FRIEDMAN, Primary Examiner

C. M. DITLOW, Assistant Examiner

U.S. Cl. X.R.

100—198, 211; 210—225, 229